(12) United States Patent
Li et al.

(10) Patent No.: US 10,790,940 B2
(45) Date of Patent: Sep. 29, 2020

(54) CONTROL CHANNEL MONITORING FOR RETRANSMISSIONS IN A COORDINATED MULTIPOINT NETWORK

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US); Hua Wang, Basking Ridge, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/253,147

(22) Filed: Jan. 21, 2019

(65) Prior Publication Data

US 2019/0229855 A1    Jul. 25, 2019

Related U.S. Application Data

(60) Provisional application No. 62/621,968, filed on Jan. 25, 2018.

(51) Int. Cl.
*H04L 1/18*     (2006.01)
*H04L 5/00*     (2006.01)
*H04W 76/27*    (2018.01)

(52) U.S. Cl.
CPC .......... *H04L 1/1819* (2013.01); *H04L 1/1887* (2013.01); *H04L 1/1896* (2013.01);
(Continued)

(58) Field of Classification Search
CPC ... H04L 1/1819; H04L 1/1887; H04L 5/0035; H04L 1/1896; H04L 5/0055;
(Continued)

(56) References Cited

U.S. PATENT DOCUMENTS

| 2003/0108027 A1* | 6/2003 | Kim | ...... H04L 1/1854 370/345 |
| 2015/0327275 A1* | 11/2015 | Kwon | ...... H04L 5/0055 370/236 |
| 2016/0234820 A1* | 8/2016 | Mallik | ...... H04L 1/1861 |

FOREIGN PATENT DOCUMENTS

| WO | 2017194733 A1 | 11/2017 |
| WO | 2017220855 A1 | 12/2017 |

OTHER PUBLICATIONS

International Search Report and Written Opinion—PCT/US2019/014552—ISA/EPO—dated Apr. 29, 2019.

* cited by examiner

*Primary Examiner* — Sharad Rampuria

(74) *Attorney, Agent, or Firm* — Harrity & Harrity, LLP

(57) ABSTRACT

Various aspects of the present disclosure generally relate to wireless communication. In some aspects, a user equipment (UE) may transmit a negative acknowledgement (NACK) corresponding to a failed communication from a first transmission/reception point (TRP) included in a coordinated multipoint network. The UE may monitor a control channel associated with a second TRP included in the coordinated multipoint network based at least in part on transmitting the NACK, wherein the first TRP and the second TRP use different frequency bands. The UE may receive a retransmission of the failed communication based at least in part on monitoring the control channel. Numerous other aspects are provided.

30 Claims, 11 Drawing Sheets

(52) U.S. Cl.
CPC .......... *H04L 5/0035* (2013.01); *H04L 5/0055* (2013.01); *H04W 76/27* (2018.02)

(58) Field of Classification Search
CPC ..... H04W 76/27; H04W 72/04; H04W 72/12; H04W 76/00; H04B 7/2121; H04B 7/2123; H04J 2203/0069; H04Q 2213/394
See application file for complete search history.

CONTROL CHANNEL MONITORING FOR RETRANSMISSIONS IN A COORDINATED MULTIPOINT NETWORK

CROSS-REFERENCE TO RELATED APPLICATIONS UNDER 35 U.S.C. § 119

This application claims priority to U.S.Provisional Patent Application No. 62/621,968, filed on Jan. 25, 2018, entitled "TECHNIQUES AND APPARATUSES FOR CONTROL CHANNEL MONITORING FOR RETRANSMISSIONS IN A COORDINATED MULTIPOINT NETWORK," which is hereby expressly incorporated by reference herein.

FIELD OF THE DISCLOSURE

Aspects of the present disclosure generally relate to wireless communication, and more particularly to techniques and apparatuses for control channel monitoring for retransmissions in a coordinated multipoint network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmission/reception point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a negative acknowledgement (NACK) corresponding to a failed communication from a first transmission/reception point (TRP) included in a coordinated multipoint network; monitoring a control channel associated with a second TRP included in the coordinated multipoint network based at least in part on transmitting the NACK, wherein the first TRP and the second TRP use different frequency bands; and receiving a retransmission of the failed communication based at least in part on monitoring the control channel.

In some aspects, a UE for wireless communication may include memory and one or more processors operatively coupled to the memory. The memory and the one or more processors may be configured to transmit a negative acknowledgement (NACK) corresponding to a failed communication from a first transmission/reception point (TRP) included in a coordinated multipoint network; monitor a control channel associated with a second TRP included in the coordinated multipoint network based at least in part on transmitting the NACK, wherein the first TRP and the second TRP use different frequency bands; and receive a retransmission of the failed communication based at least in part on monitoring the control channel.

In some aspects, a non-transitory computer-readable medium may store one or more instructions for wireless communication. The one or more instructions, when executed by one or more processors of a UE, may cause the one or more processors to transmit a negative acknowledgement (NACK) corresponding to a failed communication from a first transmission/reception point (TRP) included in a coordinated multipoint network; monitor a control channel associated with a second TRP included in the coordinated multipoint network based at least in part on transmitting the NACK, wherein the first TRP and the second TRP use different frequency bands; and receive a retransmission of the failed communication based at least in part on monitoring the control channel.

In some aspects, an apparatus for wireless communication may include means for transmitting a negative acknowledgement (NACK) corresponding to a failed communication from a first transmission/reception point (TRP) included in a coordinated multipoint network; means for monitoring a control channel associated with a second TRP included in the coordinated multipoint network based at least in part on transmitting the NACK, wherein the first TRP and the second TRP use different frequency bands; and means for receiving a retransmission of the failed communication based at least in part on monitoring the control channel.

Aspects generally include a method, apparatus, system, computer program product, non-transitory computer-readable medium, user equipment, base station, wireless communication device, transmission/reception point, controller, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
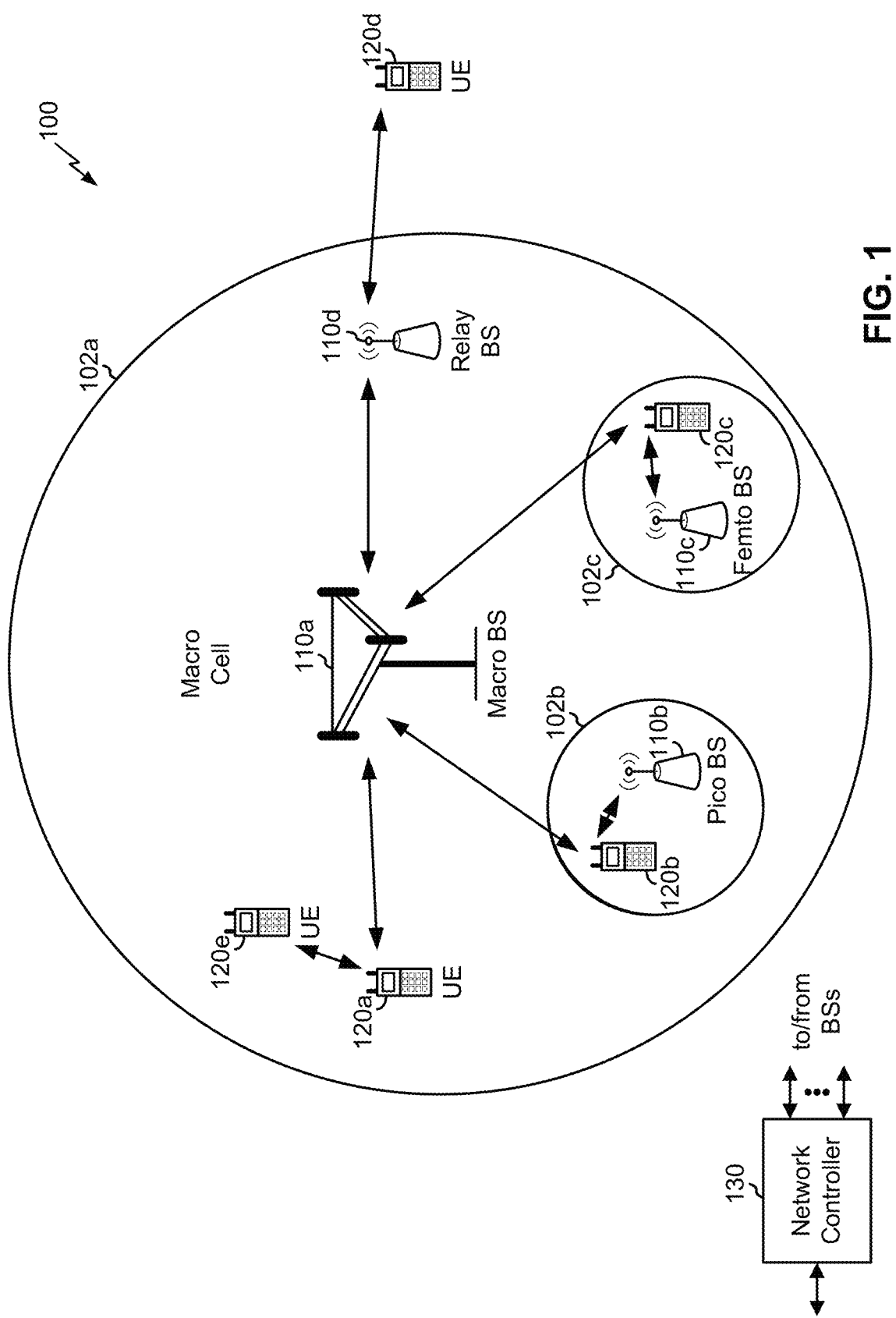
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmission/reception point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, actuators, programmable logic controllers (PLCs), meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
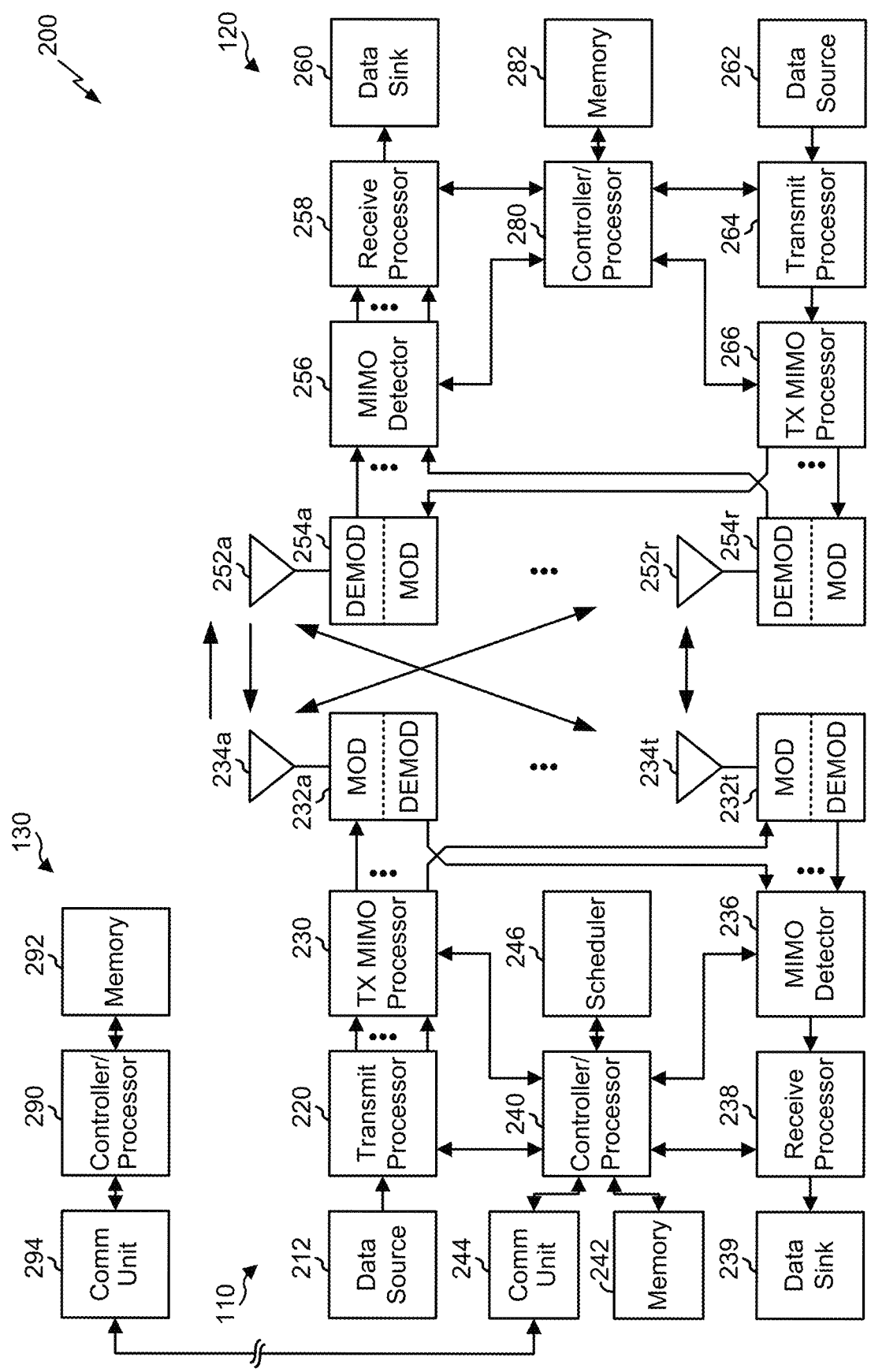
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with control channel monitoring for retransmissions in a coordinated multipoint network, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting a negative acknowledgement (NACK) corresponding to a failed communication from a first transmission/reception point (TRP) included in a coordinated multipoint network; means for monitoring a control channel associated with a second TRP included in the coordinated multipoint network based at least in part on transmitting the NACK, wherein the first TRP and the second TRP use different frequency bands; means for receiving a retransmission of the failed communication based at least in part on monitoring the control channel; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
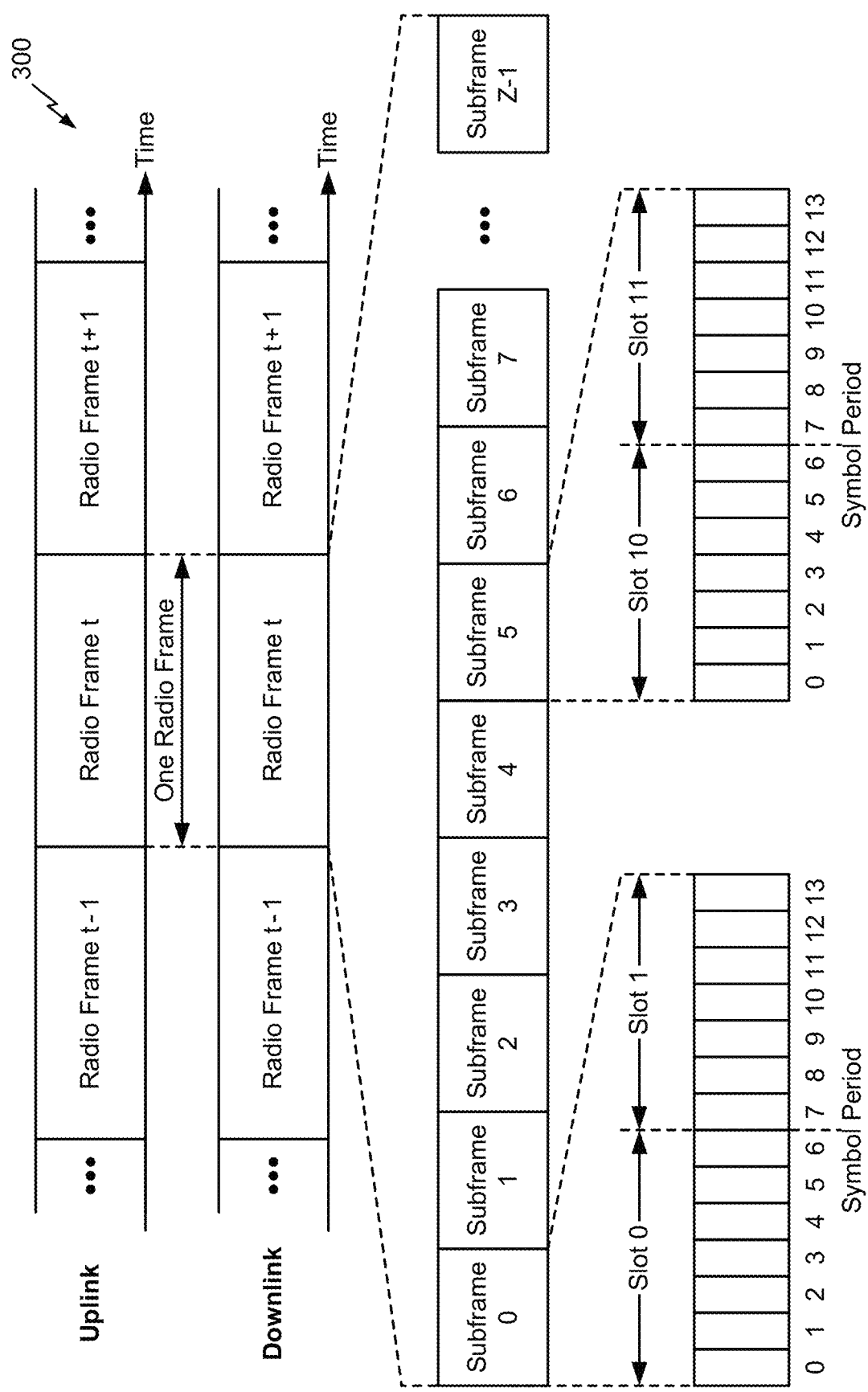
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z ($Z \geq 1$) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
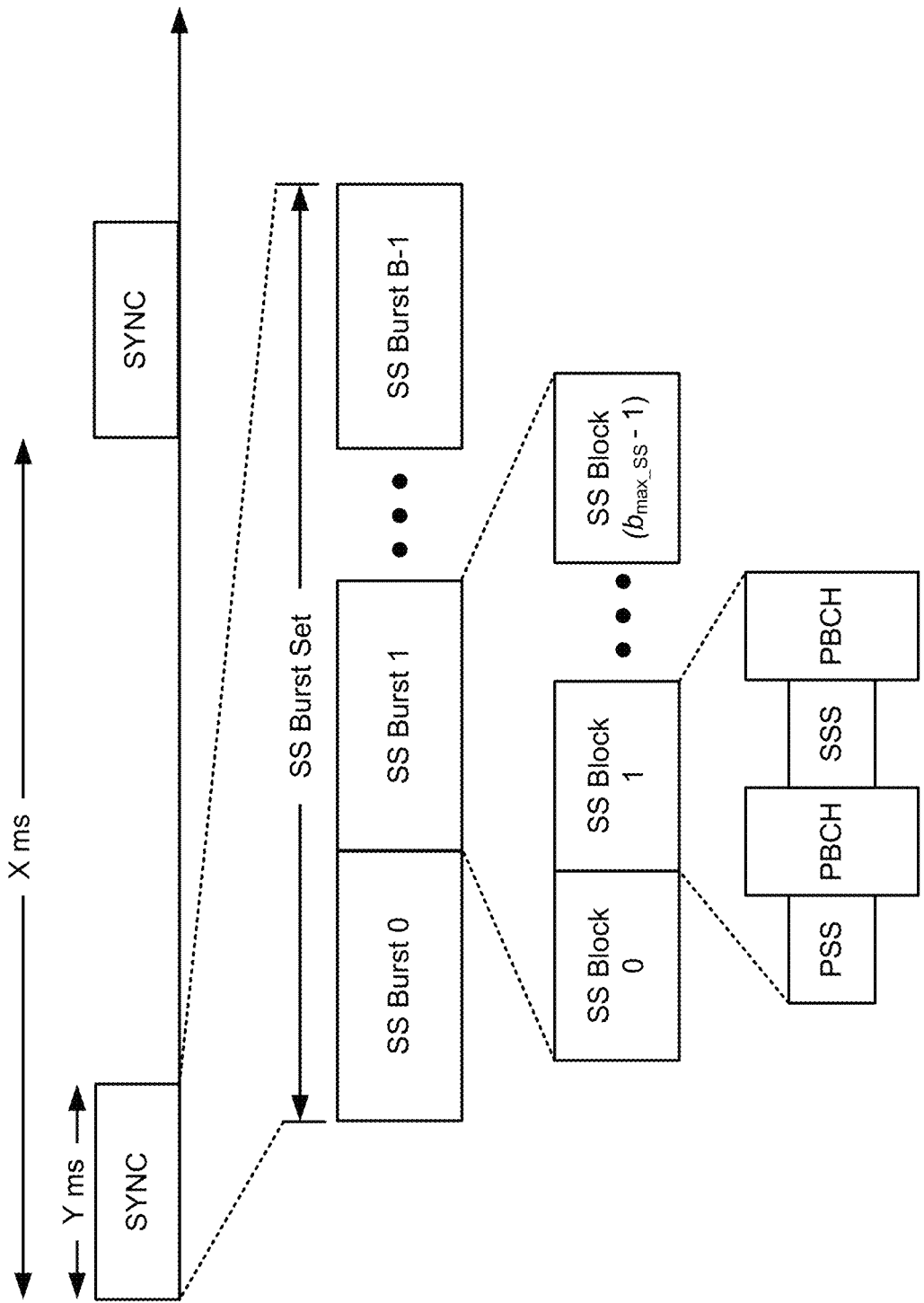
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
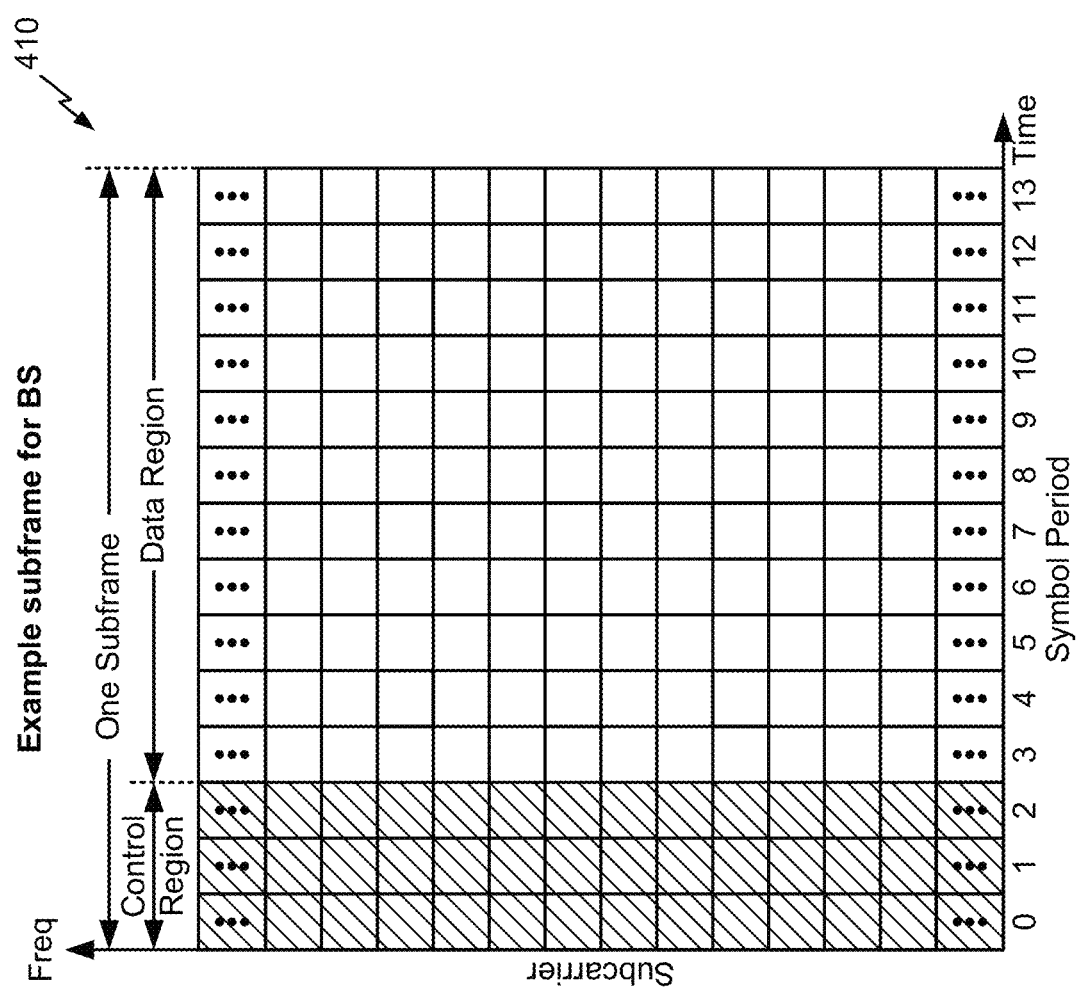
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
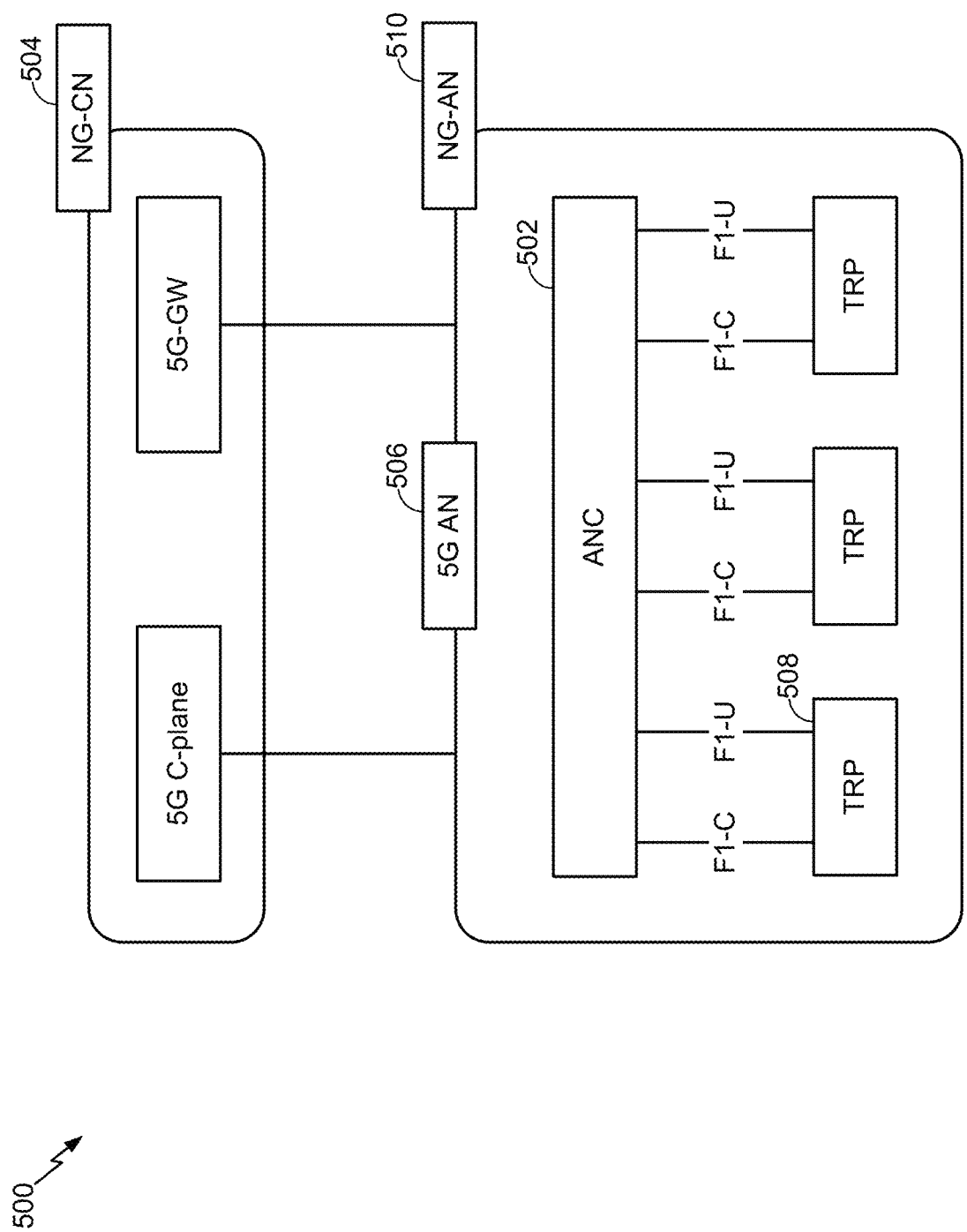
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
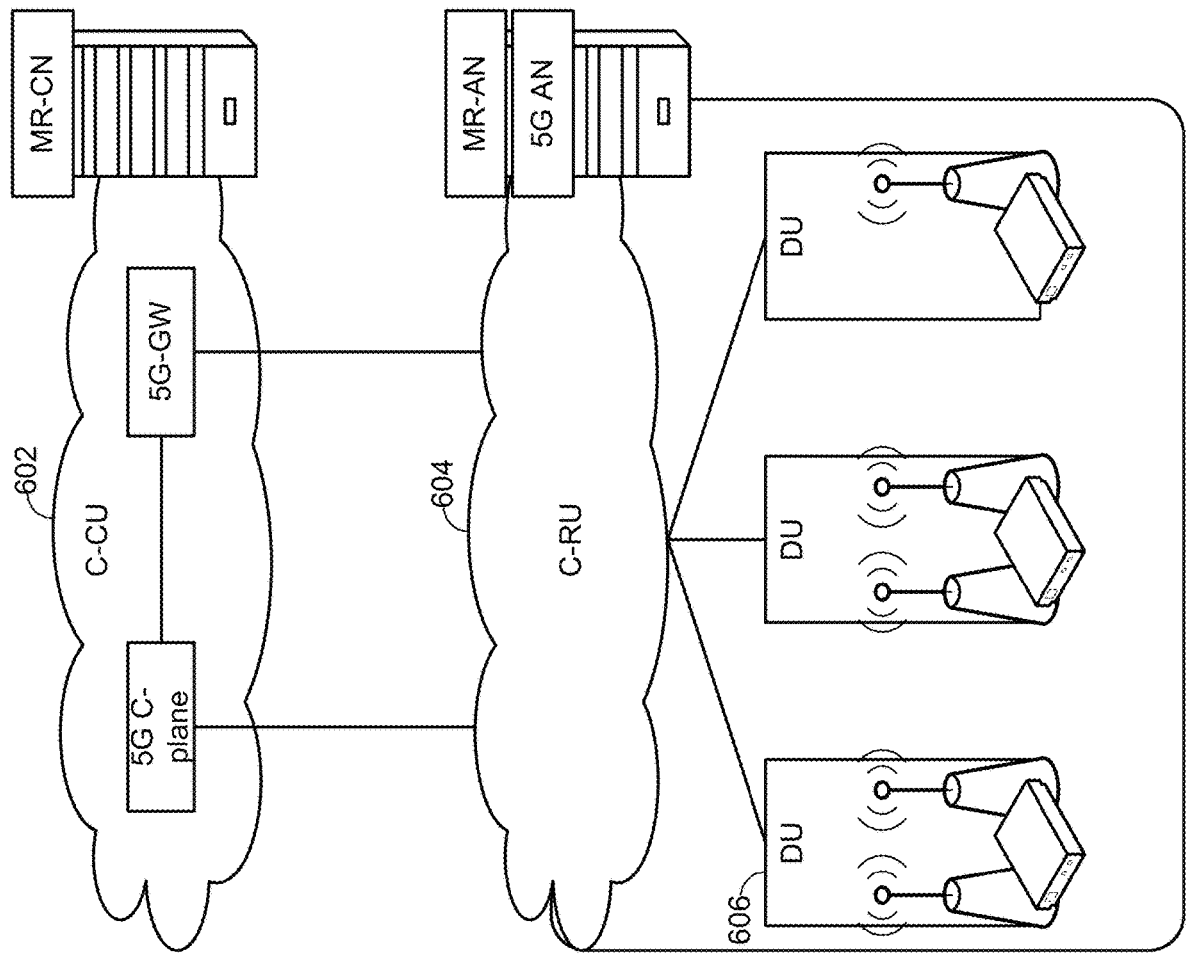
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
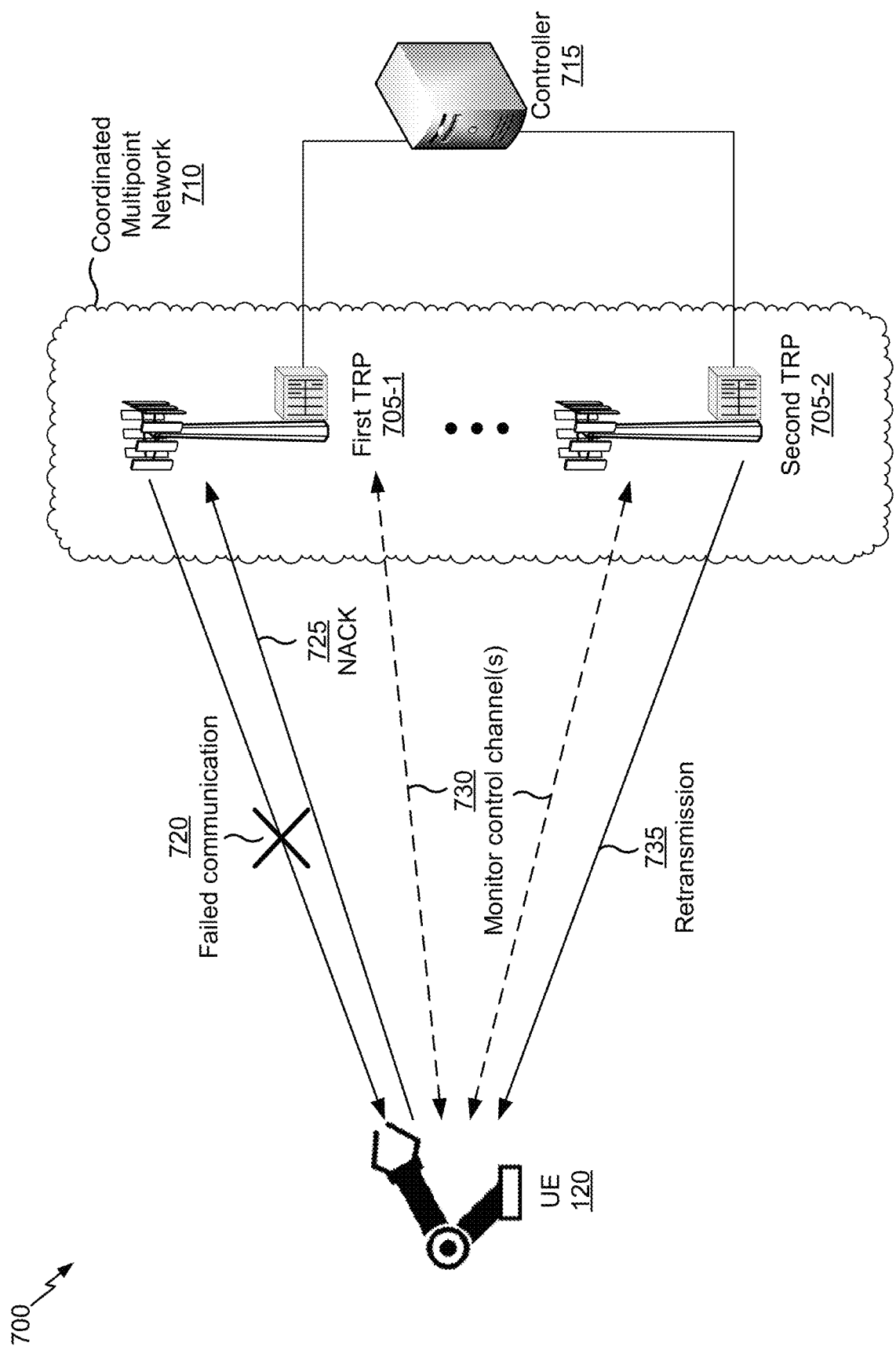
FIGS. 7-9 are diagrams illustrating examples of control channel monitoring for retransmissions in a coordinated multipoint network, in accordance with various aspects of the present disclosure.

FIG. 7 is a diagram illustrating an example 700 of control channel monitoring for retransmissions in a coordinated multipoint network, in accordance with various aspects of the present disclosure.

As shown in FIG. 7, a UE 120 (e.g., an MTC UE and/or the like, shown as a robotic arm) may be capable of communicating with multiple TRPs 705 (e.g., a base station 110, an antenna 234 of base station 110, a TRP 508, a DU 606, and/or the like), shown as a first TRP 705-1 and a second TRP 705-2. The multiple TRPs 705 may be included in a coordinated multipoint network 710. The coordinated multipoint network 710 may be used to send information to the UE 120 and/or receive information from the UE 120 via multiple TRPs 705 to improve performance (e.g., in case of dynamic network conditions, poor network conditions, and/or the like). In some aspects, the first TRP 705-1 and the second TRP 705-2 use different frequency bands for communication. For example, the coordinated multipoint network 710 may be a frequency reuse network (e.g., may employ frequency reuse across TRPs 705), where different TRPs 705 reuse frequency bands, but adjacent TRPs 705 use different frequency bands to mitigate interference. In this case, the first TRP 705-1 and the second TRP 705-2 may be adjacent TRPs 705 or may otherwise use different frequency bands for communication (e.g., according to a frequency reuse pattern employed by the coordinated multipoint network 710). Although the coordinated multipoint network 710 of FIG. 7 shows two TRPs 705, in practice, the coordinated multipoint network 710 may include more than two TRPs 705.

The TRPs 705 in the coordinated multipoint network 710 may use coordinated scheduling and/or coordinated beamforming to improve performance. In coordinated scheduling, the TRPs 705 may communicate with a controller 715 (e.g., a network controller 130, a controller/processor 240 of base station 110, an ANC 502, a C-RU 604, and/or the like), which may perform centralized scheduling for transmissions to a UE 120 (or multiple UEs 120) by multiple TRPs 705. The transmissions may be scheduled to occur at the same time (e.g., using the same frequency or different frequencies), or may be scheduled to occur at different times (e.g., using the same frequency or different frequencies), so as to improve reception by the UE 120.

In some aspects, the controller 715 may instruct the TRPs 705 to transmit using joint transmission (JT), where multiple TRPs 705 transmit the same information to a UE 120 in the same time slot using coordinated beamforming (e.g., with appropriate beamforming weights applied to transmissions by different TRPs 705). In some aspects, the controller 715 may instruct the TRPs 705 to transmit using dynamic point selection (DPS), where a single TRP 705 transmits information to a UE 120 per time slot (e.g., using appropriate beamforming, which may be indicated to the TRP 705 by the controller 715), and where different TRPs 705 may be scheduled for transmission to the UE 120 in different time slots. This may improve performance by dynamically scheduling different TRPs 705 to transmit information to the UE 120 based at least in part on channel conditions, which may account for shadowing, channel fading, and/or the like.

However, in some settings, such as an industrial environment (e.g., a factory that uses factory automation for communication between machines), a channel condition referred to as fast shadowing may occur. In fast shadowing, channel conditions may change very quickly due to reflection and/or blockage of signals by machines that move rapidly (e.g., a mechanical arm, a robot, and/or the like), such as up to 20 meters per second, for example. Often, channel conditions in fast shadowing may change so rapidly (e.g., every 10 ms and/or the like) that re-association and/or handover to a different TRP 705, which may take approximately 65-90 ms, may not be fast enough to keep up with the change in channel conditions (e.g., channel conditions may change dramatically before handover is completed). In this case, transmissions by multiple TRPs 705 in a coordinated multipoint network 710 may be used to increase spatial diversity and improve reception of signals.

In some aspects, a hybrid automatic repeat request (HARD) procedure may be used in a coordinated multipoint network 710 and/or in a setting where fast shadowing may occur. In this case, channel conditions may change rapidly, such that the TRP 705 that transmits a failed communication to a UE 120 (e.g., a communication for which the UE 120 responds with a negative acknowledgement, or NACK) may have poor channel conditions with the UE 120 after the NACK is received and a retransmission is to occur. In this case, one or more retransmissions may be transmitted by a different TRP 705 and/or by multiple TRPs 705 (e.g., including or excluding the original TRP 705 that transmitted the failed communication). Some techniques and apparatuses described herein permit a UE 120 to monitor control channels of multiple and/or different TRPs 705 to enable reception of such retransmission(s).

As shown by reference number 720, a communication from a first TRP 705-1 to the UE 120 may fail. For example, the UE 120 may receive the communication (e.g., a packet and/or the like), and may be unable to decode the communication, may detect an error after decoding the communication (e.g., after performing a cyclic redundancy check), and/or the like.

As shown by reference number 725, the UE 120 may transmit a negative acknowledgement (NACK) corresponding to the failed communication. As shown, in some aspects, the UE 120 may transmit the NACK to the first TRP 705-1. Additionally, or alternatively, the UE 120 may transmit the NACK to one or more other TRPs 705, such as the second TRP 705-2 and/or another TRP.

As shown by reference number 730, the UE 120 may monitor a control channel (e.g., a PDCCH and/or the like) associated with the second TRP 705-2 based at least in part on transmitting the NACK. In some aspects, the UE 120 may monitor a control channel on a second frequency band used by the second TRP 705-2, which may be different from a first frequency band used by the first TRP 705-1. The UE 120 may monitor the control channel for information regarding a retransmission of the failed communication, such as a grant for the retransmission, a set of resource blocks in which the retransmission is to be transmitted and/or received, and/or the like. By monitoring a control channel and/or receiving a retransmission of a different TRP 705 (e.g., the second TRP 705-2) than the TRP 705 that transmitted the failed communication (e.g., the first TRP 705-1), the UE 120 may increase the likelihood of successful reception of the retransmission, particularly in an environment where channel conditions change rapidly.

Additionally, or alternatively, and as further shown by reference number 730, the UE 120 may monitor a control channel associated with the first TRP 705-1 based at least in part on transmitting the NACK. For example, to improve spatial diversity, the UE 120 may monitor a first control channel on a first frequency band used by the first TRP 705-1, in addition to monitoring a second control channel on a second frequency band used by the second TRP 705-2. However, in some aspects, the UE 120 may not monitor the first control channel because the failed communication was transmitted by the first TRP 705-1, which may be associated with poor channel conditions. In some aspects, the UE 120 may monitor multiple control channels concurrently or simultaneously (e.g., in a same time slot, in a same downlink control (PDCCH) portion of a slot (e.g., a self-contained slot), and/or the like). As indicated above, the UE 120 may monitor the control channel for information regarding a retransmission of the failed communication. By monitoring multiple control channels of multiple TRPs 705 and/or receiving retransmissions from multiple TRPs 705 (e.g., the first TRP 705-1, the second TRP 705-2, and/or the like), the UE 120 may increase the likelihood of successful reception of the retransmission(s), particularly in an environment where channel conditions change rapidly.

In some aspects, the UE 120 may identify one or more control channels to be monitored based at least in part on a pattern (e.g., a monitoring pattern). In some aspects, the pattern may be indicated to the UE 120 (e.g., by one or more TRPs 705). For example, the pattern may be indicated in a radio resource control (RRC) message (e.g., an RRC configuration message, an RRC reconfiguration message, and/or the like), in a SIB, in an SS block, in downlink control information (DCI), and/or the like.

In some aspects, the pattern may indicate one or more control channels (e.g., corresponding to one or more TRPs 705) to be monitored based at least in part on a TRP 705 that transmitted the failed communication (e.g., the first TRP 705-1). For example, to improve spatial diversity, the pattern may indicate that when the failed communication is from a first TRP 705-1, the UE 120 is to monitor a control channel of a second TRP 705-2 (e.g., and not the first TRP 705-1). As another example, to further improve spatial diversity, the pattern may indicate that when the failed communication is from a first TRP 705-1, the UE 120 is to monitor a first control channel of the first TRP 705-1 and a second control channel of the second TRP 705-2. As yet another example, the pattern may indicate that when the failed communication is from a first TRP 705-1, the UE 120 is to monitor a second control channel of the second TRP 705-2 and a third control channel of a third TRP 705-3 (not shown) included in the coordinated multipoint network 710. As still another example, the pattern may indicate that when the failed communication is from a first TRP 705-1, the UE 120 is to monitor a first control channel of the first TRP 705-1, a second control channel of the second TRP 705-2, and a third control channel of the third TRP 705-3. Other examples are possible depending on the number and arrangement of TRPs 705 included in the coordinated multipoint network 710.

Additionally, or alternatively, the pattern may indicate one or more control channels (e.g., corresponding to one or more TRPs 705) to be monitored based at least in part on a HARQ index associated with the failed communication and/or the retransmission. The HARQ index may indicate a number of retransmission attempts for an initial failed communication. For example, a first HARQ index value (e.g., 1) for a retransmission may indicate that the retransmission is a first retransmission of an initial failed communication, a second HARQ index value (e.g., 2) for a retransmission may indicate that the retransmission is a second retransmission of an initial failed communication, and/or the like. In some aspects, to satisfy a reliability and/or latency requirement (e.g., a URLLC requirement), the pattern may indicate an increasing number of control channels to be monitored as the number of retransmission attempts increases. For example, the pattern may indicate that the UE 120 is to monitor one control channel of one TRP 705 on a first retransmission attempt, may indicate that the UE 120 is to monitor two control channels of two TRPs 705 on a second retransmission attempt, and/or the like.

In some aspects, the pattern may indicate one or more control channels (e.g., corresponding to one or more TRPs 705) to be monitored based at least in part on the HARQ index and the TRP 705 that transmitted the failed communication. For example, to improve spatial diversity, the pattern may indicate that for a first retransmission attempt of a failed communication from a first TRP 705-1, the UE 120 is to monitor a first control channel of the first TRP 705-1 and a second control channel of a second TRP 705-2. As another example, the pattern may indicate that for a second retransmission attempt of the failed communication from the first TRP 705-1, the UE 120 is to monitor a first control channel of the first TRP 705-1, a second control channel of a second TRP 705-2, and a third control channel of a third TRP 705-3. In this way, spatial diversity may be improved, and a likelihood of satisfying a reliability and/or latency requirement may be improved.

In some aspects, the UE 120 may identify one or more control channels to be monitored without using a pattern (e.g., a monitoring pattern) indicated to the UE 120. For example, in some aspects, the UE 120 may monitor all control channels of all TRPs 705 assigned to the UE 120 in the coordinated multipoint network 710. For example, the UE 120 may perform blind decoding of DCI across all frequency bands used by TRPs 705 in the coordinated multipoint network 710. In this way, signaling overhead may be reduced.

As shown by reference number 735, the UE 120 may receive a retransmission of the failed communication based at least in part on monitoring the control channel. For example, the control channel may indicate a set of resource blocks, in a data channel (e.g., a PDSCH and/or the like), in which the retransmission is scheduled. The UE 120 may obtain this information by monitoring the control channel, and may monitor the indicated set of resource blocks to receive the retransmission. By monitoring for a retransmission from multiple TRPs 705 and/or a different TRP 705 than the TRP 705 that transmitted the failed communication, the UE 120 may increase the likelihood of successful reception of the retransmission, particularly in an environment where channel conditions change rapidly. Furthermore, in the case where the UE 120 receives multiple retransmissions from multiple TRPs 705, the UE 120 may combine the retransmissions (e.g., using chase combining, incremental redundancy, and/or the like), which may improve decoding performance.

As indicated above, FIG. 7 is provided merely as an example. Other examples are possible and may differ from what was described with regard to FIG. 7.

Figure 8:
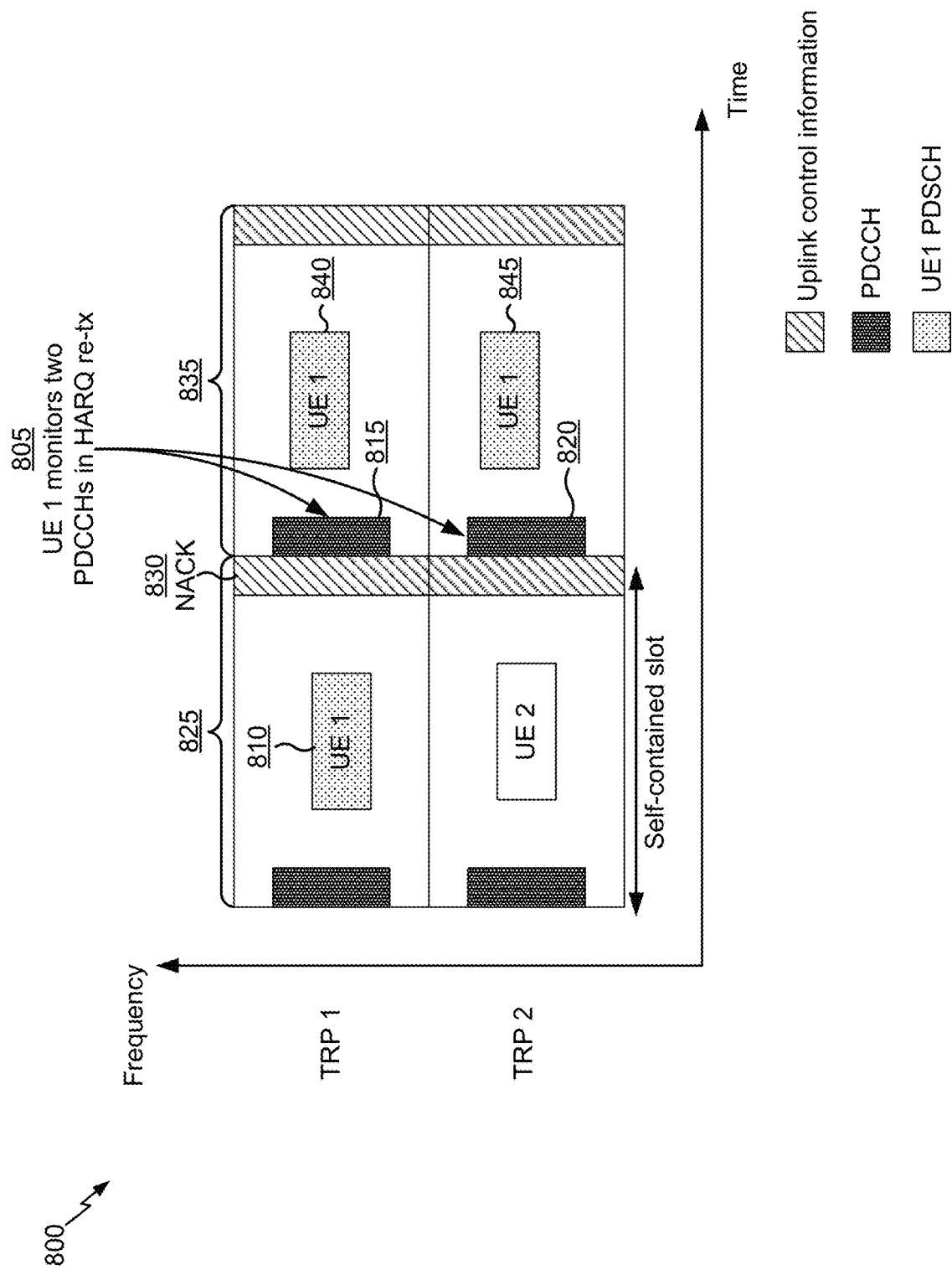

FIG. 8 is a diagram illustrating another example 800 of control channel monitoring for retransmissions in a coordinated multipoint network, in accordance with various aspects of the present disclosure.

As shown by reference number 805, in some aspects, the UE 120 (shown as UE 1) may monitor multiple control channels (e.g., downlink control channels, PDCCHs, and/or the like) after a failed communication 810 from a first TRP (shown as TRP 1). In some aspects, the multiple control channels may include a first control channel 815 of the first TRP and a second control channel 820 of a second TRP (shown as TRP 2).

For example, in a first slot 825 (e.g., a self-contained slot in which downlink data communications are acknowledged or negatively acknowledged in the same slot in which the downlink data communications are received), the first TRP may transmit a first communication to the UE 120 (e.g., UE 1), and the second TRP may transmit a second communication to another UE (e.g., shown as UE 2). As shown by reference number 830, the UE 120 may transmit a NACK to the first TRP in the first slot 825, indicating that the first communication failed.

The UE 120 may then monitor the first control channel 815 and the second control channel 820 in a second slot 835 (e.g., immediately subsequent to the first slot 825) to obtain control information regarding a first retransmission 840 from the first TRP and a second retransmission 845 from the second TRP, respectively. The UE 120 may monitor for and/or receive the first retransmission 840 and the second retransmission 845 using the control information, and may decode the first retransmission 840 and the second retransmission 845 (e.g., using chase decoding, incremental redundancy, and/or the like) to obtain data. In this way, the likelihood of the UE 120 receiving the data may be improved via spatial diversity, incremental redundancy, and/or the like.

As indicated above, FIG. 8 is provided merely as an example. Other examples are possible and may differ from what was described with regard to FIG. 8.

Figure 9:
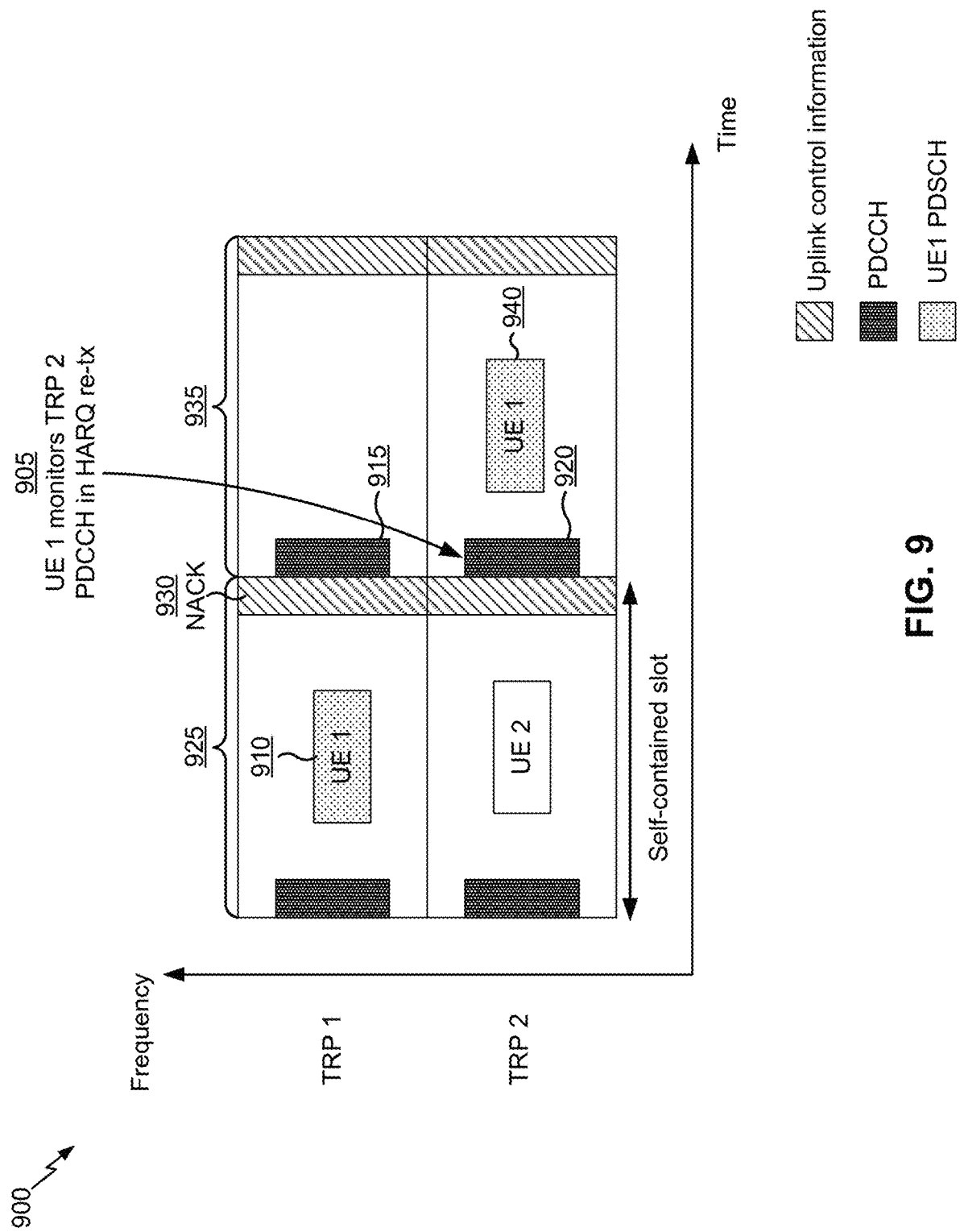

FIG. 9 is a diagram illustrating another example 900 of control channel monitoring for retransmissions in a coordinated multipoint network, in accordance with various aspects of the present disclosure.

As shown by reference number 905, in some aspects, the UE 120 (shown as UE 1) may monitor a single control channel after a failed communication 910 from a first TRP (shown as TRP 1). In some aspects, the single control channel may exclude a first control channel 915 of the first TRP, and may include a second control channel 920 of a second TRP (shown as TRP 2).

For example, in a first slot 925 (e.g., a self-contained slot in which downlink data communications are acknowledged or negatively acknowledged in the same slot in which the downlink data communications are received), the first TRP may transmit a first communication to the UE 120 (e.g., UE 1), and the second TRP may transmit a second communication to another UE (e.g., shown as UE 2). As shown by reference number 930, the UE 120 may transmit a NACK to the first TRP in the first slot 925, indicating that the first communication failed.

The UE 120 may then monitor the second control channel 920 in a second slot 935 (e.g., without monitoring the first control channel 915 in the second slot 935) to obtain control information regarding a retransmission 940 from the second TRP. The UE 120 may monitor for and/or receive the retransmission 940 using the control information, and may decode the retransmission 940 to obtain data. In this way, the likelihood of the UE 120 receiving the data may be improved via spatial diversity when channel conditions between the UE 120 and the first TRP are poor.

As indicated above, FIG. 9 is provided merely as an example. Other examples are possible and may differ from what was described with regard to FIG. 9.

Figure 10:
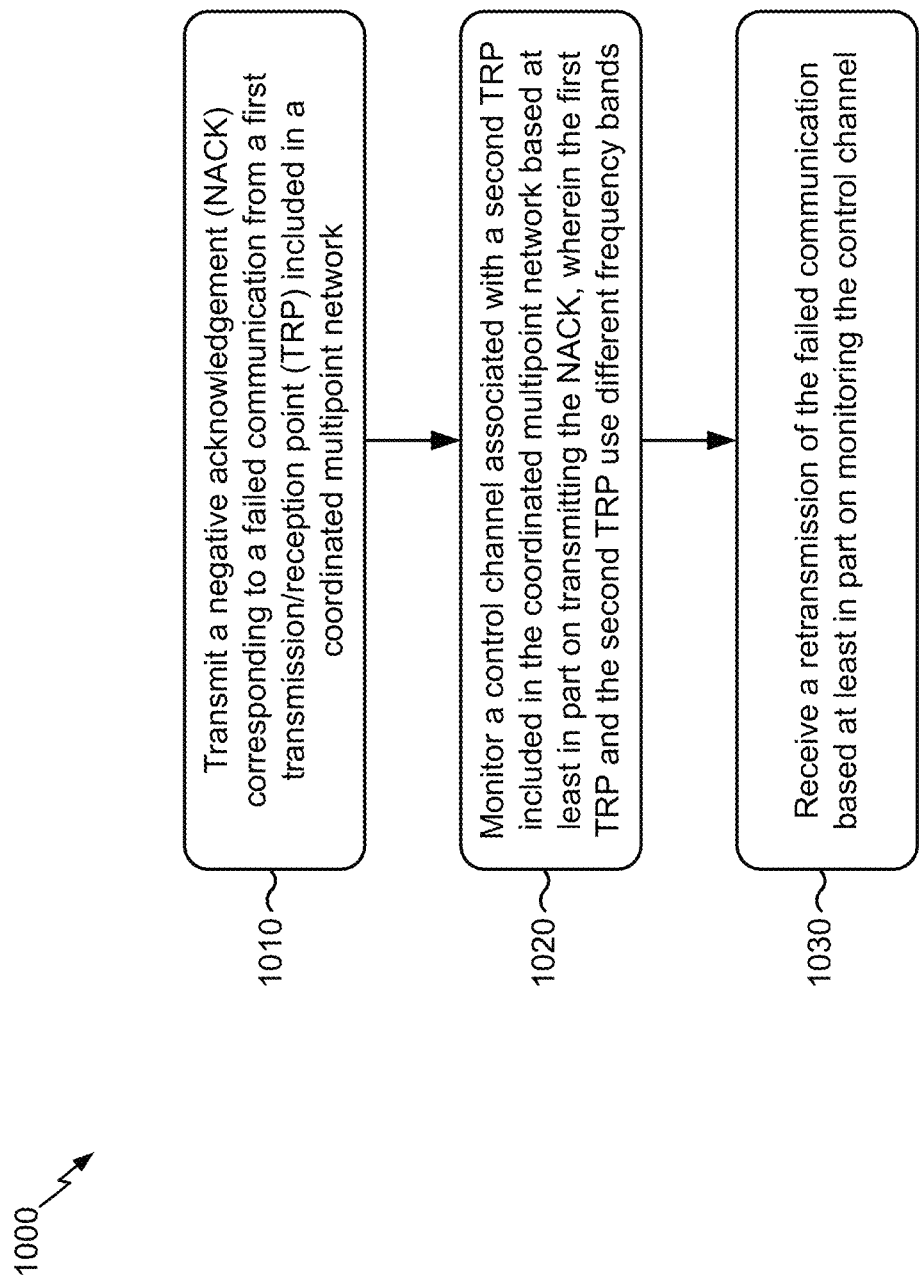
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs control channel monitoring for retransmissions in a coordinated multipoint network.

As shown in FIG. 10, in some aspects, process 1000 may include transmitting a negative acknowledgement (NACK) corresponding to a failed communication from a first transmission/reception point (TRP) included in a coordinated multipoint network (block 1010). For example, the UE may transmit (e.g., using controller/processor 280, transmit processor 264, TX MIMO processor 266, MOD 254, antenna 252, and/or the like) a NACK corresponding to a failed communication from a first TRP included in a coordinated multipoint network, as described above in connection with FIGS. 7-9.

As further shown in FIG. 10, in some aspects, process 1000 may include monitoring a control channel associated with a second TRP included in the coordinated multipoint network based at least in part on transmitting the NACK, wherein the first TRP and the second TRP use different frequency bands (block 1020). For example, the UE may monitor (e.g., using antenna 252, DEMOD 254, MIMO detector 256, receive processor 258, controller/processor 280, and/or the like) a control channel associated with a second TRP included in the coordinated multipoint network based at least in part on transmitting the NACK, as described above in connection with FIGS. 7-9. In some aspects, the first TRP and the second TRP use different frequency bands.

As further shown in FIG. 10, in some aspects, process 1000 may include receiving a retransmission of the failed communication based at least in part on monitoring the control channel (block 1030). For example, the UE may receive (e.g., using antenna 252, DEMOD 254, MIMO detector 256, receive processor 258, controller/processor 280, and/or the like) a retransmission of the failed communication based at least in part on monitoring the control channel, as described above in connection with FIGS. 7-9.

Process 1000 may include additional aspects, such as any single aspect or any combination of aspects described below.

In some aspects, the control channel is identified based at least in part on a pattern. In some aspects, the pattern is indicated in a radio resource control (RRC) message. In some aspects, the pattern indicates the control channel based at least in part on at least one of: the first TRP, a hybrid automatic repeat request (HARQ) index associated with the retransmission, or some combination thereof.

In some aspects, the control channel is identified based at least in part on information included in a radio resource control (RRC) message. In some aspects, the control channel is identified based at least in part on the first TRP. In some aspects, the control channel is identified based at least in part on a hybrid automatic repeat request (HARQ) index associated with the retransmission. In some aspects, the control channel is identified based at least in part on the first TRP and a hybrid automatic repeat request (HARQ) index associated with the retransmission.

In some aspects, monitoring the control channel comprises monitoring a plurality of control channels corresponding to a plurality of TRPs included in the coordinated multipoint network, wherein the plurality of control channels includes the control channel. In some aspects, the plurality of control channels includes all control channels of all frequency bands used in the coordinated multipoint network. In some aspects, the plurality of control channels includes the control channel, associated with the second TRP, and another control channel associated with the first TRP. In some aspects, a control channel associated with the first TRP is not monitored for control information associated with the retransmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a negative acknowledgement (NACK) corresponding to a failed communication from a first transmission/reception point (TRP) included in a coordinated multipoint network;

monitoring a control channel associated with a second TRP included in the coordinated multipoint network based at least in part on transmitting the NACK,
    wherein the first TRP and the second TRP use different frequency bands, and
    wherein the control channel is identified based at least in part on at least one of:
        the first TRP,
        a hybrid automatic repeat request (HARQ) index associated with a retransmission of the failed communication, or
        some combination thereof; and
    receiving the retransmission of the failed communication based at least in part on monitoring the control channel.

2. The method of claim 1, wherein the control channel is identified based at least in part on a pattern.

3. The method of claim 2, wherein the pattern is indicated in a radio resource control (RRC) message.

4. The method of claim 2, wherein the pattern indicates the control channel based at least in part on at least one of:
    the first TRP,
    the HARQ index associated with the retransmission, or
    some combination thereof.

5. The method of claim 1, wherein the control channel is identified based at least in part on information included in a radio resource control (RRC) message.

6. The method of claim 1, wherein the control channel is identified based at least in part on the first TRP.

7. The method of claim 1 wherein the control channel is identified based at least in part on the HARQ associated with the retransmission.

8. The method of claim 1, wherein the control channel is identified based at least in part on the first TRP and the HARQ index associated with the retransmission.

9. The method of claim 1, wherein monitoring the control channel comprises monitoring a plurality of control channels corresponding to a plurality of TRPs included in the coordinated multipoint network, wherein the plurality of control channels includes the control channel.

10. The method of claim 9, wherein the plurality of control channels includes all control channels of all frequency bands used in the coordinated multipoint network.

11. The method of claim 9, wherein the plurality of control channels includes the control channel, associated with the second TRP, and another control channel associated with the first TRP.

12. The method of claim 1, wherein a control channel associated with the first TRP is not monitored for control information associated with the retransmission.

13. A user equipment (UE) for wireless communication, comprising:
    memory; and
    one or more processors operatively coupled to the memory, the memory and the one or more processors configured to:
        transmit a negative acknowledgement (NACK) corresponding to a failed communication from a first transmission/reception point (TRP) included in a coordinated multipoint network;
        monitor a control channel associated with a second TRP included in the coordinated multipoint network based at least in part on transmitting the NACK,
            wherein the first TRP and the second TRP use different frequency bands, and
            wherein the control channel is identified based at least in part on at least one of:
                the first TRP,
                a hybrid automatic repeat request (HARQ) index associated with a retransmission of the failed communication, or
                some combination thereof; and
        receive the retransmission of the failed communication based at least in part on monitoring the control channel.

14. The UE of claim 13, wherein the control channel is identified based at least in part on a pattern.

15. The UE of claim 14, wherein the pattern is indicated in a radio resource control (RRC) message.

16. The UE of claim 14, wherein the pattern indicates the control channel based at least in part on at least one of:
    the first TRP,
    the HARQ index associated with the retransmission, or
    some combination thereof.

17. The UE of claim 13, wherein the control channel is identified based at least in part on information included in a radio resource control (RRC) message.

18. The UE of claim 13, wherein the control channel is identified based at least in part on the first TRP.

19. The UE of claim 13, wherein the one or more processors, when monitoring the control channel, are configured to monitor a plurality of control channels corresponding to a plurality of TRPs included in the coordinated multipoint network, wherein the plurality of control channels includes the control channel.

20. The UE of claim 19, wherein the plurality of control channels includes:
    all control channels of all frequency bands used in the coordinated multipoint network, or
    the control channel, associated with the second TRP, and another control channel associated with the first TRP.

21. The UE of claim 13, wherein a control channel associated with the first TRP is not monitored for control information associated with the retransmission.

22. A non-transitory computer-readable medium storing instructions for wireless communication, the instructions comprising:
    one or more instructions that, when executed by one or more processors of a user equipment (UE), cause the one or more processors to:
        transmit a negative acknowledgement (NACK) corresponding to a failed communication from a first transmission/reception point (TRP) included in a coordinated multipoint network;
        monitor a control channel associated with a second TRP included in the coordinated multipoint network based at least in part on transmitting the NACK,
            wherein the first TRP and the second TRP use different frequency bands, and
            wherein the control channel is identified based at least in part on at least one of:
                the first TRP,
                a hybrid automatic repeat request (HARQ) index associated with a retransmission of the failed communication, or
                some combination thereof; and
        receive the retransmission of the failed communication based at least in part on monitoring the control channel.

23. The non-transitory computer-readable medium of claim 22, wherein the control channel is identified based at least in part on a pattern.

24. The non-transitory computer-readable medium of claim 22, wherein the control channel is identified based at least in part on information included in a radio resource control (RRC) message.

25. The non-transitory computer-readable medium of claim 23, wherein the pattern indicates the control channel based at least in part on at least one of:
the first TRP,
the HARQ index associated with the retransmission, or
the first TRP and the HARQ index.

26. The non-transitory computer-readable medium of claim 22, wherein the one or more instructions, that cause the one or more processors to monitor the control channel, further cause the one or more processors to monitor a plurality of control channels corresponding to a plurality of TRPs included in the coordinated multipoint network, wherein the plurality of control channels includes the control channel.

27. An apparatus for wireless communication, comprising:
means for transmitting a negative acknowledgement (NACK) corresponding to a failed communication from a first transmission/reception point (TRP) included in a coordinated multipoint network;
means for monitoring a control channel associated with a second TRP included in the coordinated multipoint network based at least in part on transmitting the NACK,
wherein the first TRP and the second TRP use different frequency bands, and
wherein the control channel is identified based at least in part on at least one of:
the first TRP,
a hybrid automatic repeat request (HARQ) index associated with a retransmission of the failed communication, or
some combination thereof; and
means for receiving the retransmission of the failed communication based at least in part on monitoring the control channel.

28. The apparatus of claim 27, wherein the control channel is identified based at least in part on information included in a radio resource control (RRC) message.

29. The apparatus of claim 27, wherein the control channel is identified based at least in part on the first TRP.

30. The apparatus of claim 27, wherein the means for monitoring the control channel comprises means for monitoring a plurality of control channels corresponding to a plurality of TRPs included in the coordinated multipoint network, wherein the plurality of control channels includes the control channel.

* * * * *